United States Patent [19]

Sakakibara

[11] 4,185,268
[45] Jan. 22, 1980

[54] PILOT LAMP MECHANISM OF A PARKING BRAKE CIRCUIT

[75] Inventor: Shigemi Sakakibara, Imasato Susonoshi, Japan

[73] Assignee: Toyota Jidosha Kogyo Kabushiki Kaisha, Aichi, Japan

[21] Appl. No.: 891,388

[22] Filed: Mar. 29, 1978

[30] Foreign Application Priority Data

May 11, 1977 [JP] Japan .............................. 52/58744[U]

[51] Int. Cl.² ............................................. B60Q 1/32
[52] U.S. Cl. ....................................... 340/69; 340/95; 362/80
[58] Field of Search ...................... 340/71, 69, 95, 87, 340/84, 89; 362/80

[56] References Cited

U.S. PATENT DOCUMENTS

| 1,529,745 | 3/1925 | Kuhns | 340/95 |
| 1,749,305 | 3/1930 | Schroeder | 340/95 |
| 2,221,178 | 11/1940 | Best | 340/89 |
| 3,800,430 | 4/1974 | Samra | 340/95 |

FOREIGN PATENT DOCUMENTS 1449519 7/1966 France ........................................ 340/69

*Primary Examiner*—Donald J. Yusko
*Attorney, Agent, or Firm*—Browdy and Neimark

[57] ABSTRACT

This invention relates to a parking brake pilot lamp mechanism which, when a parking brake of a car is actuated, turns on not only a brake warning lamp of an electric circuit but also a rear pilot lamp, and specifically to the mechanism of the type wherein said rear pilot lamp has a warning function to following cars as well as an illuminating function of the trunk room.

5 Claims, 4 Drawing Figures

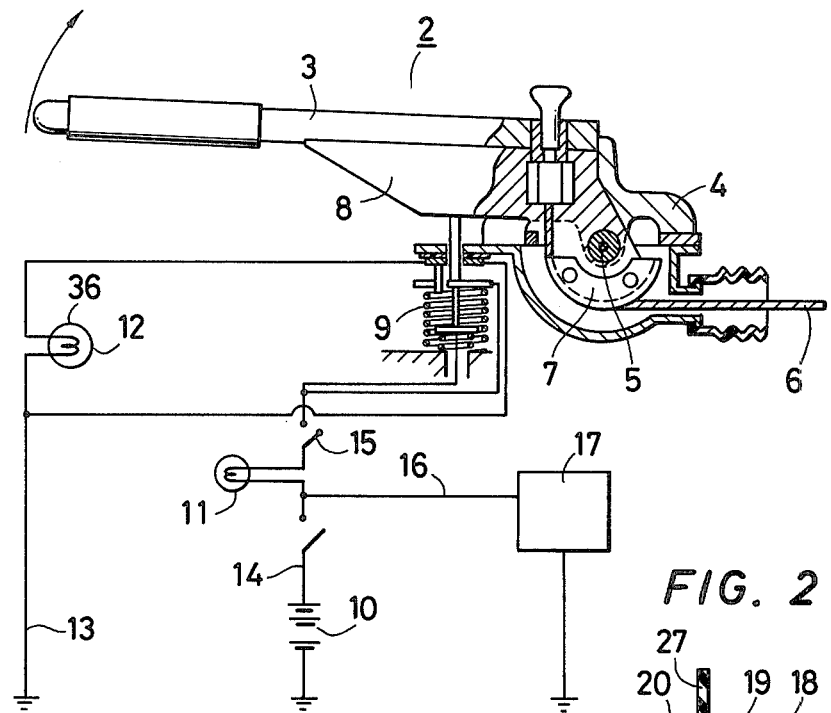
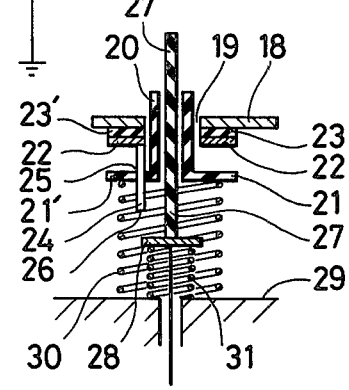
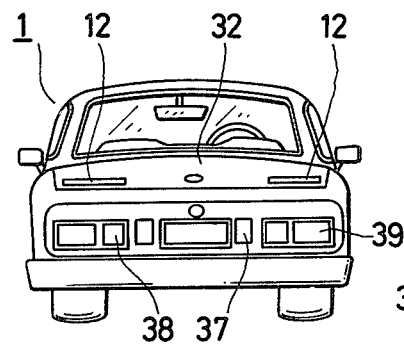
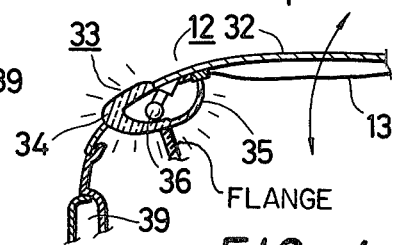

PILOT LAMP MECHANISM OF A PARKING BRAKE CIRCUIT

DETAILED DESCRIPTION OF THE INVENTION

In driving a car, it is a customary practice to use a parking brake for parking on the road or temporarily stopping at a crossing. In an electric circuit interposed to the parking brake, however, only a brake warning lamp is fitted to a dashboard in order to prevent the driver from forgetting the braking operation, but no such lamp is interposed in a tail lamp circuit.

When the tail lamp is not lit, therefore, collosion occurs one after another not only at the time of rainfall and in the evening but also even in the daytime due to insufficient caution by drivers of following cars.

A solution for this problem in the first place would be the provision of the abovementioned circuit also to the brake lamp so as to turn on the brake lamp when either of the foot brake and parking brake is actuated. However, the current Safety Regulations prohibit the lighting operation of the brake lamp and the parking brake.

To cope with the problem mentioned above, the first object of the present invention is to make it possible to simply display the warning of the parking brake to the drivers of the following cars by furnishing the trunk lid of the car with another pilot lamp interposed in the warning lamp circuit of the parking brake. The second object of the invention is to provide a novel pilot lamp mechanism which enhances the operation efficiency in handling luggages into and out from the trunk room by way of actuating the parking brake.

BRIEF DESCRIPTION OF THE DRAWINGS

FIG. 1 is a schematic view of the parking brake device and the pilot lamp circuit of the invention;

FIG. 2 is a schematic view of a switch mechanism;

FIG. 3 is a schematic view of the rear portion of a car; and

FIG. 4 is a schematic view of the pilot lamp for the trunk and the trunk lid.

DESCRIPTION OF THE PREFERRED EMBODIMENT

The construction of the present invention for accomplishing the abovementioned objects enables to turn on the brake warning lamp as well as a pilot lamp provided in the rear part of the trunk room when the parking brake of the car is actuated, and employs a red lens to cover the outside of said pilot lamp so as to allow the drivers of the following cars to confirm stopping of the car. When the trunk lid is opened for taking luggages into and out from the trunk during parking, the red lens of the pilot lamp also provides warning to the drivers of the following cars and an illumination lamp provided at the front of the pilot lamp illuminates the inside of the trunk, thereby facilitating handling of the luggages. Furthermore, the pilot lamp mechanism of the invention functions also as a trouble indicator at the time of trouble of the car by opening the trunk lid.

A preferred embodiment of the present invention will now be described with reference to the accompanying drawings.

A brake lever 3 of an operating section 2 of the parking brake device ordinarily fitted to the car 1 is actuated and raised upright by a center shaft 5 of a sector 4 and allows a return cable 6 to act on the brake mechanism via a guide 7 by means of a return mechanism not shown.

A switch mechanism 9 is disposed below the lower surface of an operating plate 8 of the abovementioned lever 3 and interposed in a circuit 13 including a power supply 10, a brake warning lamp 11 and a pilot lamp 12 to be later described.

Feference numeral 14 is an ignition switch; 15 is a parking lamp switch which is turned off, when not necessary, so as to prevent lighting of a parking lamp to be described later and is normally kept ON; and 16 is a circuit interposed between the power supply 10 and the parking lamp switch 15 and furnished with other electric components and instruments 17.

In the abovementioned switch mechanism 9, a flange contact 21 is fitted loosely and movably in the vertical direction into a hole 19 of a guide case 18, and a contact 22 is adapted to the guide case 18 via an insulation member 23 so as to correspond to the flange contact 21 and wired to the abovementioned pilot lamp 12.

An insulation bar 24 downardly extends from a contact 22' disposed, separately from the contact 22, on the opposed side of the hole 19 via an insulation member 23', penetrates through a hole 25 of an insulation flange 21' and has a contact 26 secured to its lower end portion. This contact 26 acts as a conductor by means of a lead wire penetrating through the contact 22' and the insulation bar 24, and the contact 22' is likewise wired to the pilot lamp 12.

A flange contact 28 is secured to the lower end portion of an insulation guide bar 27 loosely fitted into the abovementioned insulation cylinder 20 so as to correspond to the contact 26 and is wired to the aforementioned parking lamp switch 15 together with the flange contact 21.

Resilient springs 30 and 31 are respectively interposed between the flange contacts 21 and 28 and between the flange contact 28 and an insulation frame 29.

Reference numeral 32 represents a trunk lid, and a lamp housing is fitted to the rear end portion on both sides of this lid and penetrates through a hole of the lid that is bored at the time of production of the lid. A lens 33 of the trunk lid 32 consists of a red warning lens 34 which extends from the outside to almost the inner half at the rear part of the trunk lid 32 and a transparent while illumination lens 35 at the front part, and incorporates therein a lamp 36 for illuminating these lenses 34 and 35.

Reference numerals 37, 38 and 39 respectively indicate ordinary back lamp, brake lamp and direction indicator lamp.

Provided that the ignition switch 14 and the parking lamp switch 15 are kept ON in advance in the abovementioned construction, when the brake lever 3 is pulled up for stopping the car at a crossing or parking on the road irrespective of day and night and rain or shine, the contacts 21 and 28 are short-circuited to the contacts 22 and 26 by the resilient springs 30 and 31 whereby the circuit 13 is closed and the brake warning lamp 11 and the pilot lamp 12, or the lamp 36, are turned on. Consequently, the driver of the car recognizes the normal operation of the parking brake from the brake warning lamp 11 and the drivers of the following cars realize the parking of the car ahead by the red color of the pilot lamp 12 of the trunk lid 32, take responsive measures and thus avoid collision, whether the brake lamp 38 and the tail lamp may be lit or not.

The mechanism of the present invention is especially effective for the brake operation in the daytime of a rainy day or at the time of operating the parking brake when the tail lamp is not used.

Generally, it is always necessary to put on the brake for parking the car on the road in order to take luggages into and out from the trunk. In this case, when the trunk lid 32 is upwardly opened, the drivers of the following cars can recognize parking of the car ahead from the red lens 34 at the inner rear part of the trunk lid 32.

At night, the red lens 34 at the upper end inside the trunk lid 32 indicates the parking and the illumination lamp 35 inside the trunk enables rapid and accurate handling of the luggages. When the illumination lamp 35 is designed and positioned so as to be perceived by the drivers of the following cars, the lamp both in red and white invites more increased attention to the car ahead.

It is simply a matter of design to provide the red lens with a flange so that, when the trunk lid 32 is upwardly opened, only the red lens thereinside is seen from the following cars while the white lens is not seen but is exclusively used for the illumination.

Though the tail lamp is lit at night, it is sometimes intercepted by the shadow of a person since the handling of luggage is made at the back of the car. Especially, a couple of persons handle the luggages, this blind effect is all the more enhanced. According to the present invention, however, since the red warning lamp is clearly lit at the uppermost portion of the elevated trunk lid, the drivers of the following cars never fail to recognize the warning lamp even in such a case.

Furthermore, the red warning lamp is also effective as a trouble indicator lamp when the trunk lid 32 is opened at the time of parking due to trouble.

When the brake lever 3 is returned in response to the return mechanism in the ordinary driving after completion of the parking, the insulation guide bar 27 extending upward from the insulation cylinder 20 is first caused to lower by the operation plate 8 against the resilient spring 31 and cuts off the flange contact 28 from the contact 26 while the parking brake is in the substantially released condition, whereby the pilot lamp 12 is turned off and the drivers of the following cars realize that the car ahead is in the normal running condition.

If the warning lamp is actuated by the same single switch mechanism as one which turns on and off the brake warning lamp 11, the drivers of the following cars would mistake that the car ahead is parking even at the time of false brake where the brake is actually ineffective.

Though the abovementioned embodiment deals with a bar-brake type, the present invention can be similarly adapted to a stick-brake type without any substantial change.

As mentioned above, in accordance with the present invention, the pilot lamp is provided at the rear part of the trunk lid in the pilot mechanism of the electric circuit of the parking brake and the lens of the pilot lamp is red at least at the outer part of the trunk lid and the inner part of the lens is used as an illumination lamp. Because of this construction, warning to the following cars can be made without using the brake lamp at the time of the use of the parking brake at a crossing or parking the car on the road, and illumination of the trunk can be made to facilitate handling of luggages to and from the trunk. In addition, the pilot lamp at the upper end inside the trunk provides the upper warning indication effect as well as a high level warning lamp indicator effect irrespective of the blind effect when the tail lamp is intercepted by a person or persons in handling the luggages to and from the trunk at night. The pilot lamp also has the trouble indication when the trunk is opened.

What is claimed is:

1. In a pilot mechanism interposed separately from brake warning lamp into a brake warning lamp circuit, a pilot lamp machanism of a parking brake circuit, the improvement wherein a pilot lamp is provided at the rear end portion of a trunk lid and has warning lens means which extends both to left and right sides of the center portion of said trunk lid, said lens means being shaped as a body having visible portions located outside and inside of said trunk lid with light from said pilot lamp passing through said lens means being visible to drivers of automobiles approaching from the rear from the portion of said lens means outside said lid when said lid is closed and from at least a part of said portion inside said lid when said lid is open.

2. The pilot lamp mechanism of a parking brake circuit as defined in claim 1, wherein said portion of said lens means outside and a part of said lens means inside of said trunk lid is red, the rest of said portion of said lens means inside having an illuminating color to aid one in observing the inside of the trunk.

3. The pilot lamp mechanism of a parking brake circuit as defined in claim 1, wherein said portion of said lens means outside and a part of said lens means inside of said trunk lid is red, a part of said lens means inside said trunk having an illuminating color.

4. The pilot lamp mechanism of a parking brake circuit as defined in claim 2, wherein said rest of said lens means having the illuminating color is located at a forward portion of said lens means inside said trunk lid.

5. The pilot lamp mechanism of a parking brake circuit as defined in claim 3, wherein an outward extending flange is provided between the red color part and the illuminating color part of said portion of said lens means inside said trunk lid, said flange being projected from said lens means to project the illuminating color against the back of automobiles when the trunk lid is opened.

* * * * *